United States Patent
Yang et al.

(10) Patent No.: US 8,854,841 B2
(45) Date of Patent: Oct. 7, 2014

(54) HIGH-SPEED REFLECTED SIGNAL DETECTION FOR PRIMARY-SIDE CONTROLLED POWER CONVERTERS

(75) Inventors: Ta-Yung Yang, Milpitas, CA (US); Li Lin, Taipei (TW); Chuh-Ching Li, Jhongli (TW); Sheng-Fu Hsu, Taipei (TW); Rui-Hong Lu, Shueishang Township, Chiayi County (TW)

(73) Assignee: System General Corporation, Sindian, Taipei County (TW)

( * ) Notice: Subject to any disclaimer, the term of this patent is extended or adjusted under 35 U.S.C. 154(b) by 546 days.

(21) Appl. No.: 12/840,919

(22) Filed: Jul. 21, 2010

(65) Prior Publication Data
US 2011/0255309 A1     Oct. 20, 2011

Related U.S. Application Data

(60) Provisional application No. 61/342,419, filed on Apr. 14, 2010.

(51) Int. Cl.
*H02M 3/335* (2006.01)

(52) U.S. Cl.
CPC ................................ *H02M 3/33523* (2013.01)
USPC ...................................................... 363/21.12

(58) Field of Classification Search
USPC .......... 363/21.16, 21.12, 21.13, 21.15, 21.08, 363/50, 55, 56.01, 40, 41, 95, 97, 131
See application file for complete search history.

(56) References Cited

U.S. PATENT DOCUMENTS

| | | | |
|---|---|---|---|
| 7,016,204 B2 | 3/2006 | Yang et al. | |
| 7,352,595 B2 | 4/2008 | Yang et al. | |
| 7,486,528 B2 | 2/2009 | Yang | |
| 7,633,776 B2 * | 12/2009 | Usui | 363/56.11 |
| 8,213,203 B2 * | 7/2012 | Fei et al. | 363/131 |
| 2008/0123377 A1 * | 5/2008 | Lin | 363/78 |
| 2008/0259659 A1 * | 10/2008 | Choi et al. | 363/50 |
| 2008/0290851 A1 * | 11/2008 | Akashi et al. | 323/283 |

* cited by examiner

*Primary Examiner* — Adolf Berhane
*Assistant Examiner* — Gary Nash
(74) *Attorney, Agent, or Firm* — McClure, Qualey & Rodack, LLP

(57) ABSTRACT

A controller for a power converter includes a clamping circuit, a switching circuit and a pulse generator. The clamping circuit is coupled to an input terminal of the controller for detecting a detection signal from a transformer. The switching circuit generates a switching signal to switch the transformer in response to the detection signal for regulating the power converter. A maximum level of the detection signal is clamped to be under a level of a threshold voltage during an off-period of the switching signal. Since the maximum level of the detection signal is clamped and the oscillating energy of the reflected signal is discharged, the speed of detecting the detection signal is increased. Therefore, the regulation of the primary-side controlled power converter can be improved accordingly.

7 Claims, 3 Drawing Sheets

# HIGH-SPEED REFLECTED SIGNAL DETECTION FOR PRIMARY-SIDE CONTROLLED POWER CONVERTERS

CROSS REFERENCE TO RELATED APPLICATIONS

The present application claims the benefit of U.S. provisional application entitled "A Clamping Circuit for Achieving a High Speed Detection of the Reflected Signal of a Transformer", U.S. Pat. No. 6,342,419, filed Apr. 14, 2010.

BACKGROUND OF THE INVENTION

1. Field of the Invention

The present invention relates generally to clamping circuits, more specifically, the present invention relates to a clamping circuit for power converters.

2. Description of the Related Art

FIG. 1 shows a primary-side controlled power converter which includes a transformer 10, a power transistor 20, a controller 100, rectifiers 40 and 50, capacitors 45 and 55, and a voltage divider. The controller 100 has an input terminal VS coupled to an auxiliary winding $N_A$ of the transformer 10. The voltage divider formed by a resistor 30 and a resistor 35 is connected in parallel with the auxiliary winding $N_A$ of the transformer 10. A reflected signal $V_{NA}$ generated by the auxiliary winding $N_A$ is attenuated by the voltage divider to generate a detection signal $V_S$ at a joint of the resistors 30 and 35. The detection signal $V_S$ is supplied to the input terminal VS of the controller 100.

The controller 100 further generates a switching signal $V_G$ coupled to control the power transistor 20 for switching a primary winding $N_P$ of the transformer 10. A secondary winding $N_S$ of the transformer 10 generates an output voltage $V_O$ via the rectifier 40 and the capacitor 45 at an output of the primary-side controlled power converter. The reflected signal $V_{NA}$ further charges the capacitor 55 via the rectifier 50 to supply a supply voltage $V_{CC}$ to a supply terminal VCC of the controller 100. The detail descriptions of the primary-side controlled power converter and the operation of detecting a detection signal of the transformer can be found in prior arts, such as U.S. Pat. No. 7,016,204 titled "Close-loop PWM Controller for Primary-side Controlled Power Converters"; U.S. Pat. No. 7,352,595 titled "Primary-side Controlled Switching Regulator"; and U.S. Pat. No. 7,486,528 titled".

FIG. 4 shows the waveforms of the switching signal $V_G$ and the reflected signal $V_{NA}$ of the auxiliary winding $N_A$ of the transformer 10. A leakage inductance of the transformer 10 and a parasitic capacitance of the power transistor 20 cause an oscillating energy with an oscillation period $T_{S1}$ at a leading edge of the reflected signal $V_{NA}$ when the switching signal $V_G$ is disabled. As this oscillation persists, the detection signal Vs cannot be accurately detected, which will slow down the regulation, especially for a high switching frequency transformer which is applied in the primary-side controlled power converter.

To achieve high-speed detection of the detection signal Vs, the oscillating period $T_{S1}$ of the reflected signal $V_{NA}$ should be shortened to improve the regulation of the primary-side controlled power converter.

BRIEF SUMMARY OF THE INVENTION

A controller for a power converter comprises a clamping circuit, a switching circuit and a pulse generator. The clamping circuit is coupled to an input terminal of the controller for detecting a detection signal from a transformer. The switching circuit generates a switching signal to switch the transformer in response to the detection signal for regulating the power converter. A maximum level of the detection signal is clamped to be under a level of a threshold voltage during an off-period of the switching signal. The clamping circuit comprises a comparison circuit and a transistor. The comparison circuit compares the detection signal with the threshold voltage for generating a level-control signal. The transistor is controlled by the level-control signal to clamp the maximum level of the detection signal. The pulse generator generates a pulse signal in response to a falling edge of the switching signal. The pulse signal is coupled to control the transistor for clamping the maximum level of the detection signal. The controller is powered by a reflected signal of the transformer. The detection signal is attenuated from the reflected signal.

A controller for a power converter comprises a switching circuit, a discharging circuit and a pulse generation circuit. The switching circuit generates a switching signal to drive a transformer in response to a detection signal obtained from the transformer for regulating the power converter. The discharging circuit is coupled to a supply terminal of the controller. The controller is powered by a reflected signal of the transformer via the supply terminal of the controller. The discharging circuit is coupled to discharge a current sourced from the supply terminal of the controller during an off-period of the switching signal. The discharging circuit comprises a comparison circuit and a transistor. The comparison circuit is coupled to compare a voltage level correlated to a voltage level at the supply terminal with a threshold voltage for generating a discharging signal. The transistor is coupled to the comparison circuit for discharging said current sourced from the supply terminal of the controller in response to the discharging signal. The pulse generation circuit generates a pulse signal in response to a falling edge of the switching signal. The pulse signal is further coupled to control the transistor for discharging the current sourced from the supply terminal of the controller.

A clamping circuit for increasing a detecting speed for a reflected signal from a transformer comprises a comparison circuit and a transistor. The comparison circuit compares a detection signal with a threshold voltage for generating a level-control signal. The transistor is coupled to the comparison circuit for clamping a maximum level of the detection signal in response to the level-control signal. The transistor is controlled by a pulse signal for clamping said maximum level of said detection signal. The pulse signal is generated by a pulse generation circuit in response to a falling edge of a switching signal. The switching signal is utilized to switch the transformer.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention provides a clamping circuit capable of achieving high-speed detection for a reflected signal from a transformer, particularly for a high switching frequency transformer of a power converter.

Figure 1:
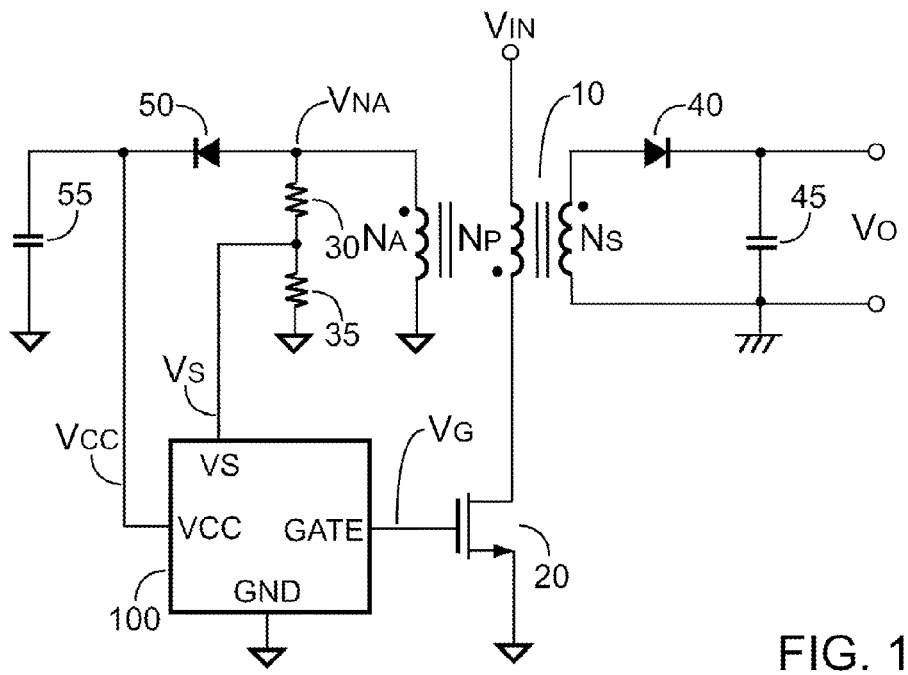
FIG. 1 shows a primary-side-regulated power converter.
Figure 2:
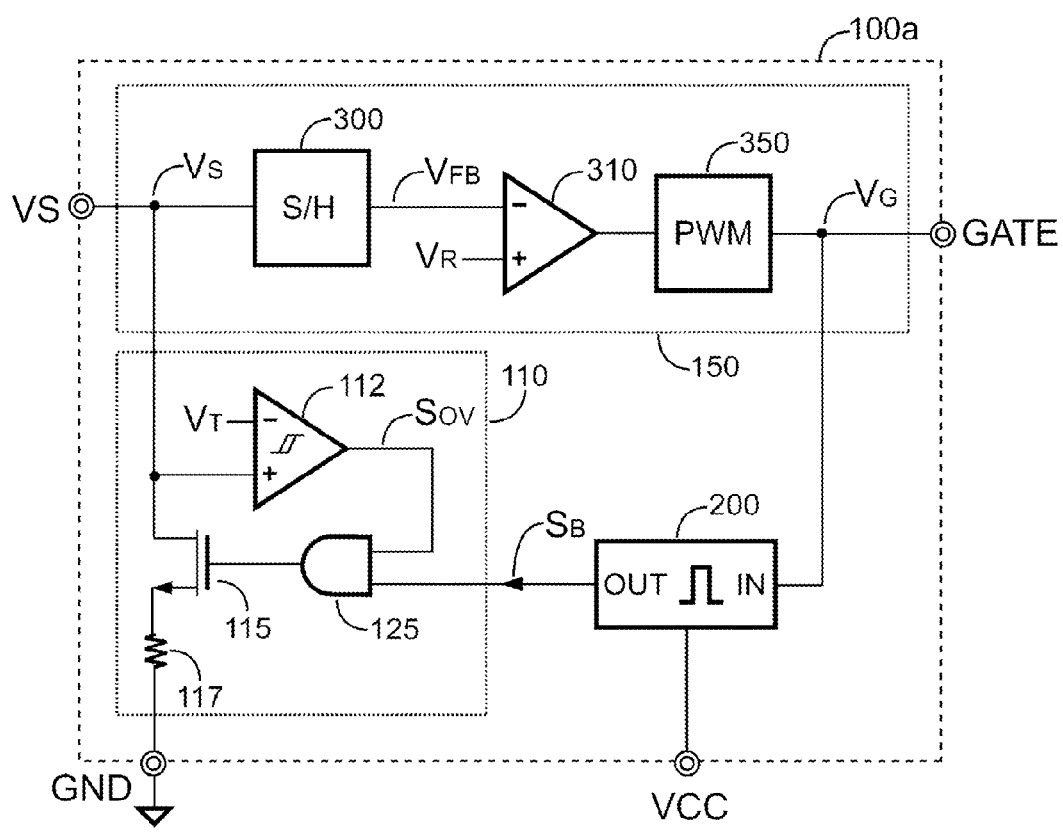
FIG. 2 shows an embodiment of a controller of the primary-side-regulated power converter according to the present invention.

FIG. 2 shows an embodiment of a controller 100a of the primary-side-regulated power converter according to the present invention. The controller 100a comprises a clamping circuit 110, a switching circuit 150 and a pulse generator 200. The clamping circuit 110 comprises a comparison circuit 112, a transistor 115, a resistor 117 and an AND gate 125. The switching circuit 150 comprises a sample-and-hold circuit (S/H) 300, an error amplifier 310 and a PWM circuit (PWM) 350. The clamping circuit 110 is coupled to an input terminal VS of the controller 100a for detecting a detection signal Vs. The detection signal Vs is attenuated from the reflected signal $V_{NA}$ via the voltage divider formed by the resistors 30 and 35 in FIG. 1. The sample-and-hold circuit 300 is coupled to the input terminal VS of the controller 100a to sample the detection signal Vs for generating a feedback signal $V_{FB}$. The error amplifier 310 amplifies a difference between a reference signal $V_R$ and the feedback signal $V_{FB}$ to generate a switching signal $V_G$ at an output terminal GATE of the controller 100a via the PWM circuit 350. The switching signal $V_G$ drives the power transistor 20 of FIG. 1 to switch the transformer 10 in response to the detection signal Vs.

The comparison circuit 112 has a negative terminal supplied with a threshold voltage $V_T$. A positive terminal of the comparison circuit 112 and a drain of the transistor 115 are connected to the input terminal VS of the controller 100a. The comparison circuit 112 compares the detection signal $V_S$ and the threshold voltage $V_T$ for generating a level-control signal $S_{OV}$. The level-control signal $S_{OV}$ is supplied to a first input of the AND gate 125. An output of the AND gate 125 controls a gate of the transistor 115. The resistor 117 is connected between a source of the transistor 115 and a ground terminal GND of the controller 100a. The ground terminal GND of the controller 100a is connected to a ground reference. The pulse generator 200 receives the switching signal $V_G$ to generate a pulse signal $S_B$ in response to the falling edge of the switching signal $V_G$. The pulse signal $S_B$ is supplied to a second input of the AND gate 125.

Figure 4:
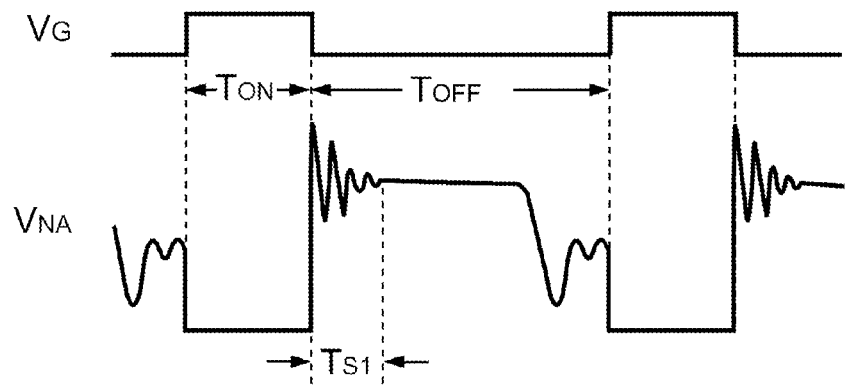
FIG. 4 shows waveforms of a switching signal and a reflected signal.

Referring to FIG. 2 and FIG. 4, once the switching signal $V_G$ is disabled, an oscillating spike resulted from an oscillating energy will occur at the leading edge of the reflected signal $V_{NA}$ sustaining for an oscillation period $T_{S1}$. The oscillating energy is caused by a leakage inductance of the transformer 10 and a parasitic capacitor of the power transistor 20.

Figure 5:
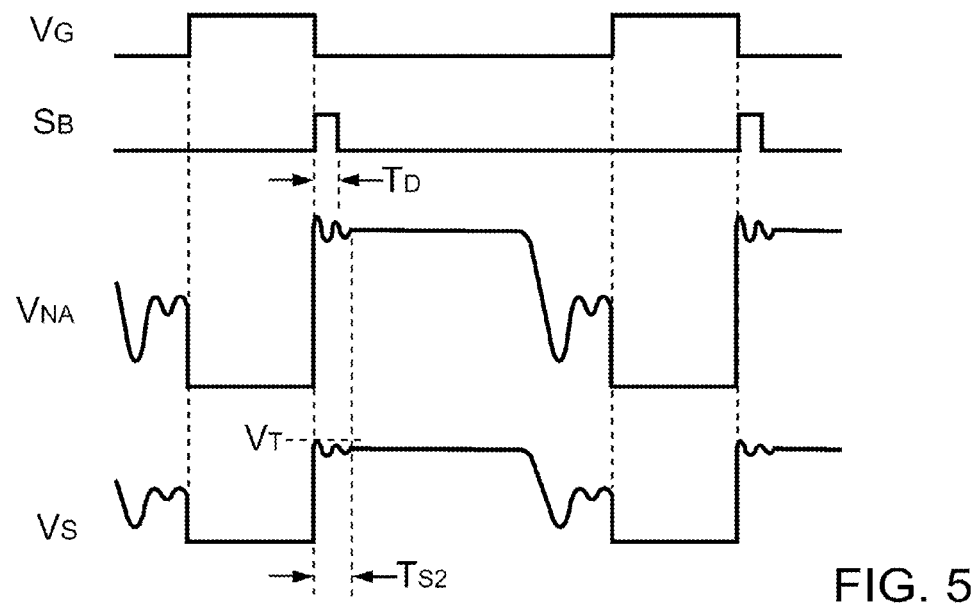
FIG. 5 shows waveforms of the switching signal, a pulse signal, the reflected signal, and a detection signal according to the present invention.

Further referring to FIG. 2 and FIG. 5, the pulse generator 200 receives the switching signal $V_G$ to generate the pulse signal $S_B$. The pulse signal $S_B$ will be enabled for a delay period $T_D$ as the switching signal $V_G$ becomes disabled. In the meantime, once the detection signal Vs exceeds the threshold voltage $V_T$, the level-control signal $S_{OV}$ will be enabled. This will turn on the transistor 115 to clamp the detection signal $V_S$ to be under a level determined by the threshold voltage $V_T$ during an off-period $T_{OFF}$ of the switching signal $V_G$.

Figure 3:
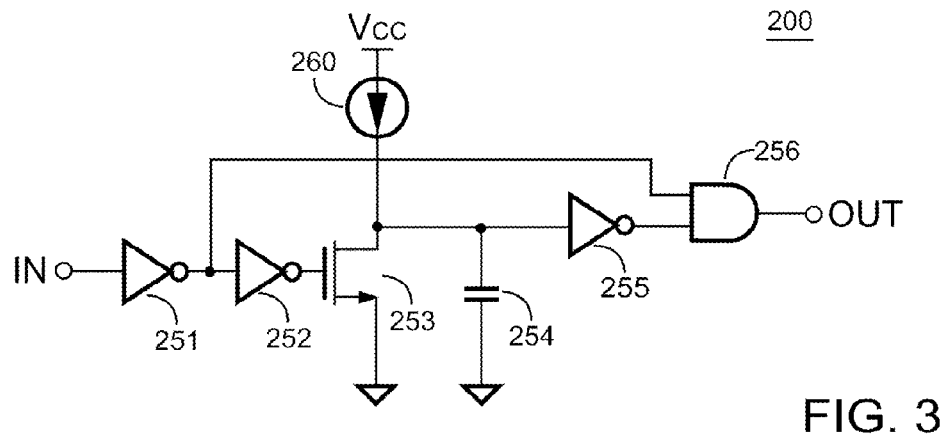
FIG. 3 shows an embodiment of a pulse generator of the controller according to the present invention.

FIG. 3 shows an embodiment of the pulse generator 200 according to the present invention. The pulse generator 200 comprises a current source 260, an inverter 251, an inverter 252, a transistor 253, a capacitor 254, an inverter 255 and an AND gate 256. The inverter 251 is connected between an input terminal IN of the pulse generator 200 and an input of the inverter 252. The input of the inverter 252 is also connected to a first input of the AND gate 256. An output of the inverter 252 is connected to a gate of the transistor 253. The current source 260 is connected between the supply voltage $V_{CC}$ and a drain of the transistor 253. A source of the transistor 253 is connected to the ground reference. The capacitor 254 is connected between the drain of the transistor 253 and the ground reference. An input of the inverter 255 is connected to the drain of the transistor 253. An output of the inverter 255 is connected to a second input of the AND gate 256. An output of the AND gate 256 is connected to an output terminal OUT of the pulse generator 200. Once a level of the input terminal IN drops from logic-high to logic-low, the output terminal OUT will generate a logic-high pulse sustaining for a period $T_D$. The period $T_D$ is determined by a current of the current source 260 and a capacitance of the capacitor 254.

FIG. 5 shows the waveforms of the switching signal $V_G$, the pulse signal $S_B$, the reflected signal $V_{NA}$ of the auxiliary winding $N_A$ and the detection signal $V_S$. Once the switching signal $V_G$ is disabled, the pulse signal $S_B$ will be enabled sustaining for the period $T_D$. Further referring to FIG. 2 and FIG. 5, the enabled pulse signal $S_B$ and the detection signal $V_S$ which exceeds the threshold voltage $V_T$ will turn on the transistor 115 via the AND gate 125 to clamp the detection signal $V_S$ to be under a level of the threshold voltage $V_T$. Since the oscillating energy of the reflected signal $V_{NA}$ is dramatically discharged, an oscillation period $T_{S2}$ occurring at the leading edge of the reflected signal $V_{NA}$ will be much shorter than the oscillation period $T_{S1}$ as shown in FIG. 4. Since the maximum level of the detection signal $V_S$ is clamped and the oscillating energy of the reflected signal $V_{NA}$ is discharged, the speed of detecting the detection signal $V_S$ is greatly increased. Therefore, the regulation of the primary-side controlled power converter can be improved accordingly.

Figure 6:
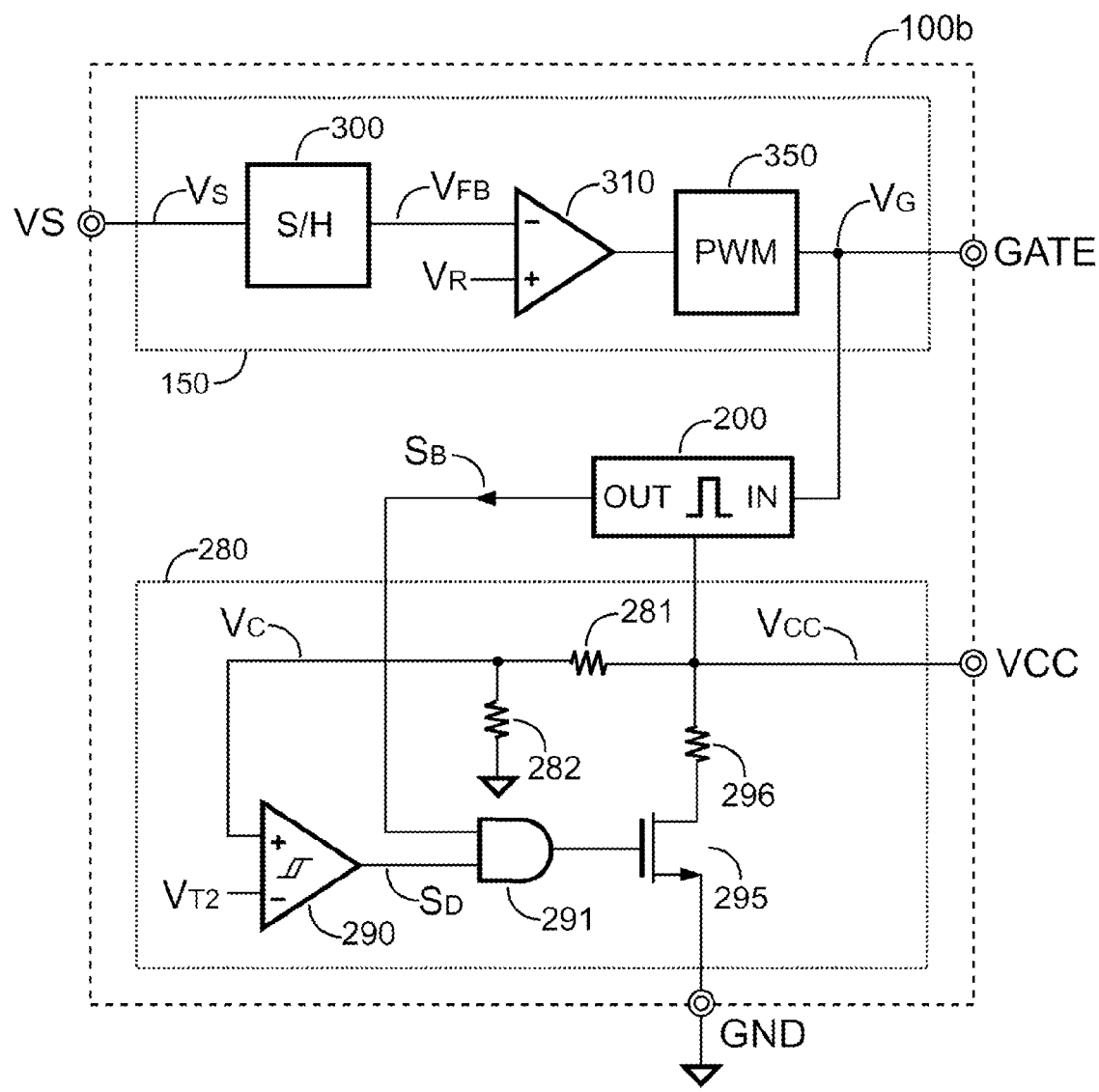
FIG. 6 shows another embodiment of the controller of the primary-side-regulated power converter according to the present invention.

FIG. 6 shows another embodiment of the controller 100b according to the present invention. The controller 100b include a discharging circuit 280 connected to a supply terminal VCC for receiving a supply voltage $V_{CC}$. The controller 100b is powered via the supply terminal VCC by the reflected signal $V_{NA}$ of the transformer 10. The discharging circuit 280 is coupled to discharge a current sourced from the supply terminal VCC during an off-period $T_{OFF}$ of the switching signal $V_G$. The discharging circuit 280 comprises a comparison circuit 290, an AND gate 291, a transistor 295 and resistors 281, 282 and 296. The resistors 281 and 282 form a voltage divider for attenuating the supply voltage $V_{CC}$ to an attenuated supply voltage $V_C$. Therefore, the attenuated supply voltage $V_C$ is correlated to the supply voltage $V_{CC}$. The comparison circuit 290 is coupled to compare the attenuated supply voltage $V_C$ with a threshold voltage $V_{T2}$ for generating a discharging signal $S_D$ at an output of the comparison circuit 290. Once the discharging signal $S_D$ and the pulse signal $S_B$ are both enabled, the transistor 295 will be turned on. This draws the current sourced from the power supply terminal VCC to the ground reference via the resistor 296 in response to the discharging signal $S_D$.

Both referring to FIG. 1 and FIG. 6, the supply voltage $V_{CC}$ supplied to the controller 100b is generated by the reflected signal $V_{NA}$ of the transformer 10. Drawing the current sourced from the power supply terminal VCC to the ground reference will also discharge the oscillating energy of the reflected signal $V_{NA}$. This dramatically shortens the oscillating period occurring at the leading edge of the reflected signal $V_{NA}$ when the switching signal $V_G$ is disabled.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A controller for a power converter, the power converter comprising a power transistor, and the controller comprising:
   a clamping circuit, coupled to an input terminal of said controller for detecting a detection signal obtained from a transformer; and
   a switching circuit, receiving said detection signal and generating a switching signal in response to said detection signal;
   wherein said power transistor is coupled to said switching circuit and driven by said switching signal to switch said transformer for regulating said power converter, and
   wherein a maximum level of said detection signal is clamped to be under a level of a threshold voltage during a delay time starting from a falling edge of said switching signal.

2. The controller as claimed in claim 1, wherein said clamping circuit comprises:
   a comparison circuit, comparing said detection signal with said threshold voltage for generating a level-control signal; and
   a transistor, controlled by said level-control signal to clamp said maximum level of said detection signal.

3. The controller as claimed in claim 2 further comprising:
   a pulse generator, generating a pulse signal having said delay time in response to the falling edge of said switching signal, wherein said pulse signal is coupled to control said transistor for clamping said maximum level of said detection signal.

4. The controller as claimed in claim 1, wherein said controller is powered by a reflected signal of said transformer, and said detection signal is attenuated from said reflected signal.

5. A controller for a power converter, the power converter comprising a power transistor, and the controller comprising:
   a switching circuit, generating a switching signal in response to a detection signal from said transformer, wherein said power transistor is coupled to said switching circuit and driven by said switching signal to switch said transformer for regulating said power converter; and
   a discharging circuit, coupled to a supply terminal of said controller, wherein said controller is powered by a reflected signal of said transformer via said supply terminal of said controller, said discharging circuit is coupled to discharge a current sourced from said supply terminal of said controller during a delay time starting from a falling edge of said switching signal.

6. The controller as claimed in claim 5, wherein said discharging circuit comprises:
   a comparison circuit, coupled to compare a voltage level correlated to a voltage level at said supply terminal with a threshold voltage for generating a discharging signal; and
   a transistor, coupled to said comparison circuit for discharging said current sourced from said supply terminal of said controller in response to said discharging signal.

7. The controller as claimed in claim 6 further comprising:
   a pulse generation circuit, generating a pulse signal having said delay time in response to a falling edge of said switching signal, wherein said pulse signal is further coupled to control said transistor for discharging said current sourced from said supply terminal of said controller.

* * * * *